Figure 1:
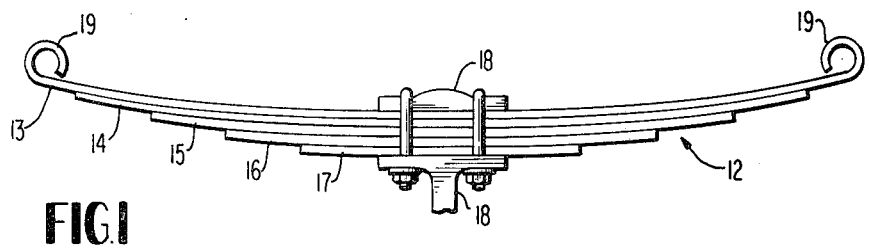

United States Patent [19]
Huchette et al.

[11] 3,900,357
[45] Aug. 19, 1975

[54] COMPOSITE MATERIAL SPRINGS AND MANUFACTURE

[75] Inventors: Paul V. Huchette; Homer H. Hall, Jr., both of Latrobe, Pa.

[73] Assignee: Edgewater Corporation, Latrobe, Pa.

[22] Filed: Nov. 30, 1972

[21] Appl. No.: 310,815

Related U.S. Application Data

[63] Continuation-in-part of Ser. No. 34,117, May 4, 1970, abandoned.

[52] U.S. Cl. ............... 156/185; 156/191; 156/195; 156/297; 264/157; 264/263; 267/47
[51] Int. Cl.² ............. B65H 81/00; B32B 31/00; B28B 11/12
[58] Field of Search .......... 156/185, 195, 221, 222, 156/228, 245, 297, 298, 173, 171; 264/263, 157; 267/47; 280/11.13 L

[56] References Cited
UNITED STATES PATENTS

| | | | |
|---|---|---|---|
| 2,744,043 | 5/1956 | Ramberg | 156/173 |
| 3,393,918 | 7/1968 | Styka | 156/172 |
| 3,438,828 | 4/1969 | Bjorwestad | 156/171 |
| 3,740,301 | 6/1973 | Manning et al. | 156/172 |

FOREIGN PATENTS OR APPLICATIONS

| | | | |
|---|---|---|---|
| 1,231,967 | 5/1967 | Germany | 310/267 |

*Primary Examiner*—Douglas J. Drummond
*Attorney, Agent, or Firm*—Shanley, O'Neil and Baker

[57] ABSTRACT

Light-weight, corrosion-resistant, elongated spring structure formed from fiber-reinforced composite material and method of manufacture in which a configuration-defining core portion is laid up from non-woven fiber plies of varying longitudinal dimension with such centrally located core portion being overlaid with a plurality of elongated plies of non-woven fibers extending between longitudinal ends of the spring structure. Transverse strength in the elongated spring structure is obtained from placement of crossply material generally contiguous to the outer surface or by helical wrapping of the longitudinally oriented plies. Included are methods for forming integral spring-mounting means and manufacture of a plurality of spring structures simultaneously.

10 Claims, 15 Drawing Figures

FIG.5
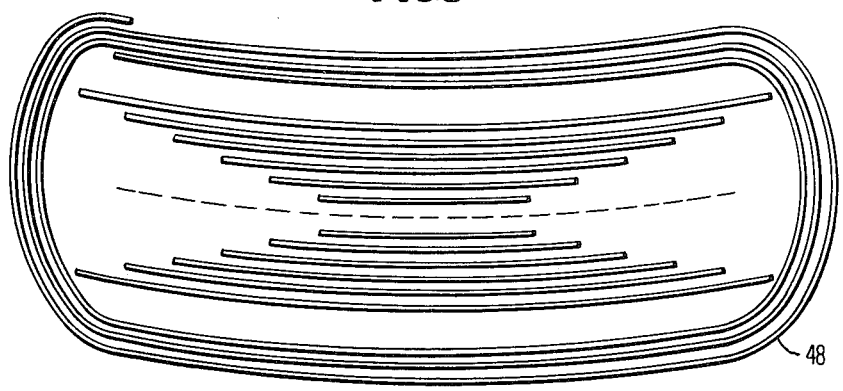
FIG.7
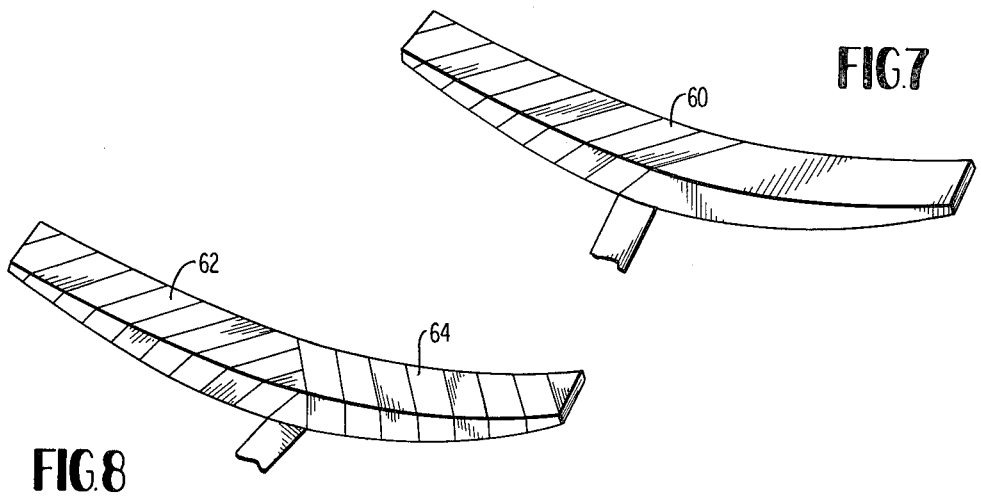
FIG.8

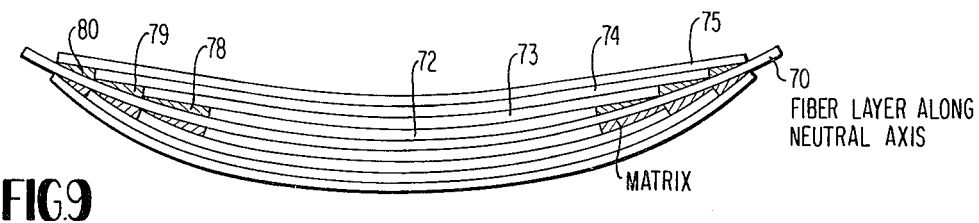
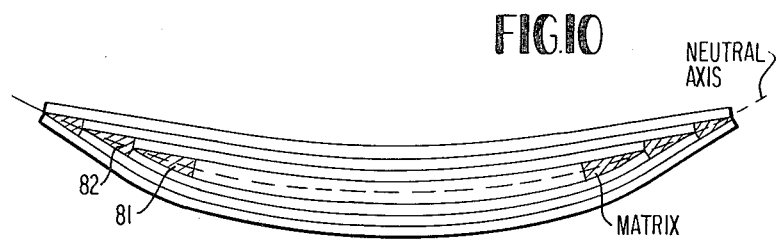
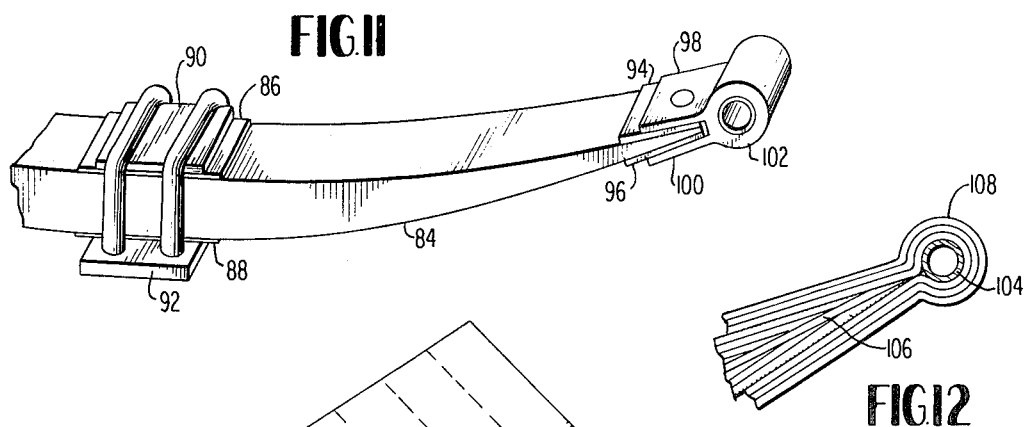
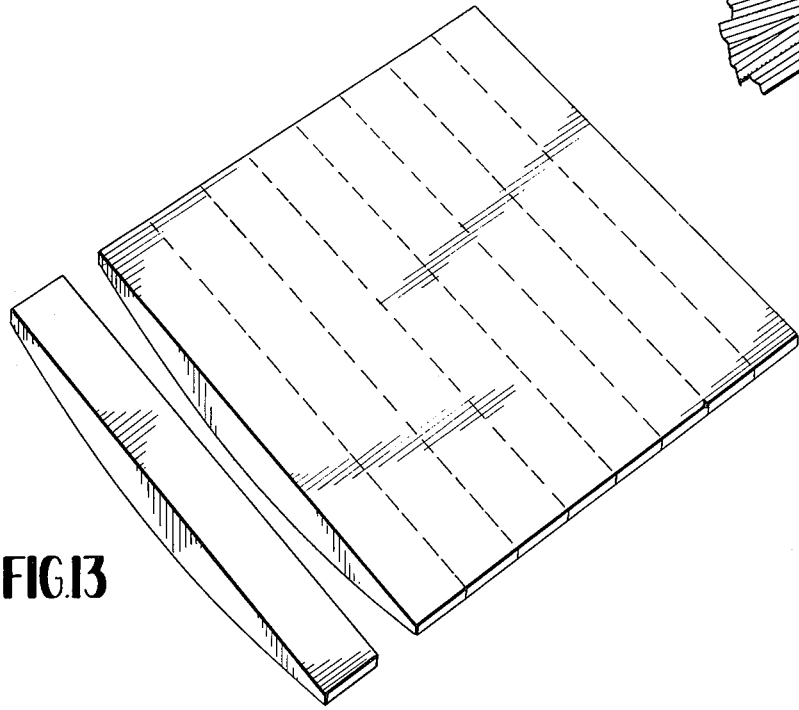

COMPOSITE MATERIAL SPRINGS AND MANUFACTURE

This application is a continuation-in-part of copending application Ser. No. 34,117, filed May 4, 1970, for "Composite Material Springs and Manufacture" now abandoned.

This invention is concerned with fiber-reinforced springs.

The potential advantages of fiber-reinforced composites have been known for some time. Similarly the growing commercial need to find improved replacements for conventional metallic springs has existed for some time. However, difficulties which have been considered inherent with composite materials or shortcomings of known fabricating techniques with composites have forestalled development of fiber-reinforced springs for many uses. For example, fiber-reinforced composites have not been adopted commercially for leaf-type spring application in vehicles.

The prime objective of this invention is to provide teachings on spring configurations and methods of fabrication which overcome such earlier limitations enabling elongated, specially contoured, fiber-reinforced springs to be manufactured economically for commercial use application calling for absorption of shock or vibration at a point or points longitudinally spaced from a relatively fixed location. In environments where lightness of weight, and resistance to corrosion and fracture are factors, such as in snowmobile springs, advantages of the products of the present invention far surpass the known features of metallic springs.

Figure 2:
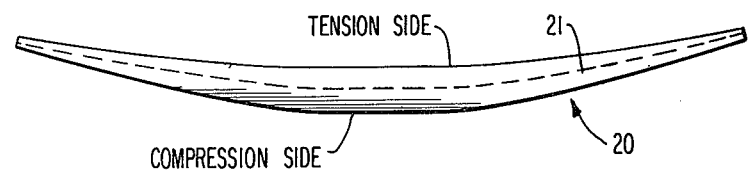
Figure 4:
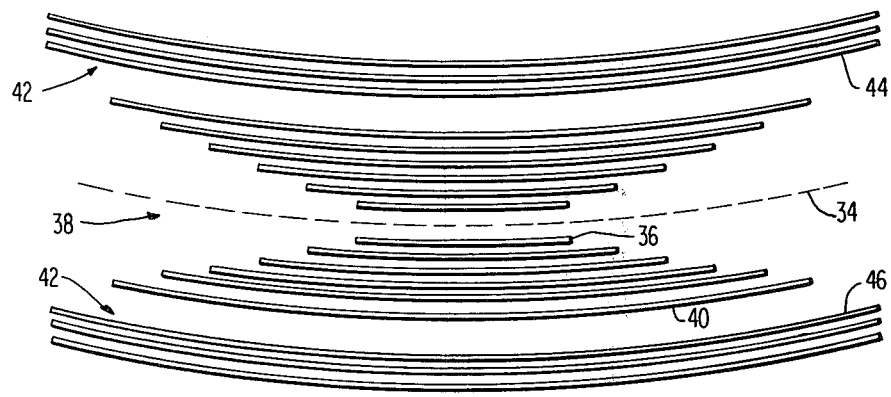
Figure 3:
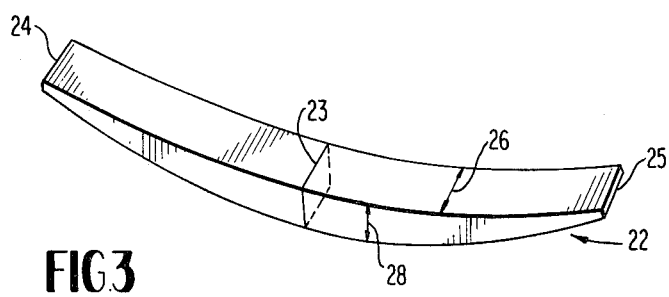
Figure 6:
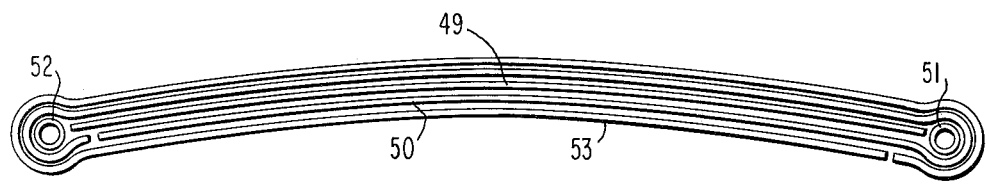
Figure 14:
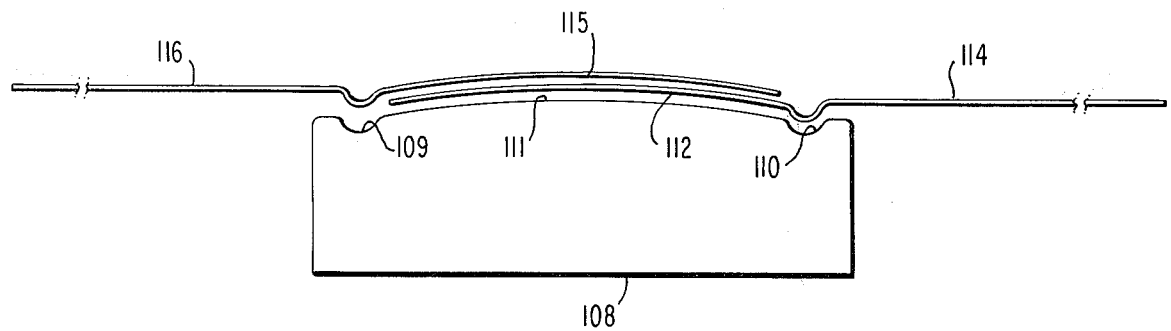
Figure 15:
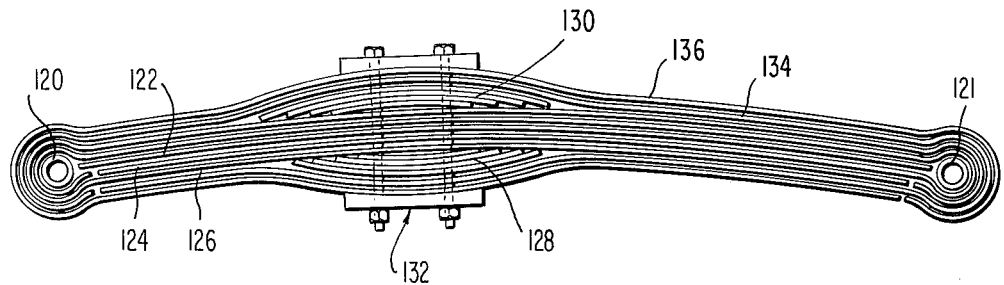

In applying the concepts of the invention to vehicle springs, reliance on a plurality of leaves acting together is eliminated. This is made possible through an important concept of the invention in the fabrication of composites which places materials best able to withstand stress at locations where greatest stress occurs. Other basic contributions will be considered in describing the invention utilizing the accompanying drawings. In these drawings:

FIG. 1 is a side view of a prior art leaf spring and mounting means,

FIG. 2 is a side view of a semi-elliptical tapered spring configuration included in the present invention, FIG. 3 is a perspective view of a semi-elliptical tapered spring configuration included in the present invention, FIG. 4 is an expanded schematic representation of fiber plies as assembled in a preferred embodiment of the invention, FIG. 5 is an expanded schematic representation of fiber plies as assembled on another embodiment of the invention, FIG. 6 is an expanded schematic representation of fiber plies as assembled to form the neutral axis lay-up of an embodiment of the invention, FIGS. 7 and 8 are perspective view of springs illustrating the helical wrapping taught by the invention, FIG. 9 is an enlarged cross-sectional schematic view of a portion of an embodiment of the invention, FIG. 10 is an enlarged cross-sectional schematic view of a portion of another embodiment of the invention, FIG. 11 is a perspective view of a portion of an embodiment of the invention with non-unitary mounting means, FIG. 12 is a schematic representation of a portion of a spring being assembled with an integral mounting means in accordance with the teachings of the invention, FIG. 13 is a schematic representation of a step in the simultaneous production of a plurality of springs in accordance with the teachings of the invention, FIG. 14 is an expanded schematic representation for illustrating the assembly of a spring on a male die member in accordance with the invention, and FIG. 15 is an expanded schematic view for illustrating the lay-up of plies in one embodiment of the invention and placement of spring mounting means.

In describing the invention, glass is presented as a specific fiber in a composite material. Matrix materials, dimensions and structural relationships are presented for purposes of making a full, clear, and exact description of an embodiment of the invention in terms readily understood in the art. However, disclosure of such specifics in describing the invention does not exclude other composite materials, dimensions and structural relationships from the scope of the invention as defined by the claims.

Referring to FIG. 1, spring 12 is a conventional leaf spring in which a plurality of leaves, such as leaves 13, 14, 15, 16, and 17 are held together by clamp 18. Along with clamp 18, eyelets 19 provide for mounting of the spring in a conventional manner.

The plurality of leaves of spring 12 acting together provide the required strength and shock-absorbing facilities. This plurality of segments acting together has not been practical for most composites, especially fiber-reinforced plastic because of its poor abrasion resistance. The invention makes practicable the manufacture of a unitary spring configuration from composite material which provides the shock-absorbing facility of a plurality of leaves.

FIG. 2 shows a side view of a spring configuration 20 made practicable for composite fabrication by the teachings of the invention. Spring 20 is semi-elliptical in configuration with neutral axis 21, shown in dotted lines, located midway between the tension and compression sides of the spring.

Spring 22 of FIG. 3 is a unitary structure in accordance with the teachings of the invention. A longitudinal midpoint or center section plane 23 is located midway between longitudinal ends 24 and 25. Width dimension 26 is measured in a plane transverse to the longitudinal axis, as shown. Width 26 is uniform throughout the length of spring 22. Thickness dimension 28, measured in a similar transverse plane in the direction shown, varies throughout the length of spring 22.

Cross-sectional area in a plane transverse to the longitudinal axis is greatest at the midpoint 23 and diminishes symmetrically in both directions in approaching the longitudinal ends 24 and 25. The result is a semi-elliptical spring which is symmetrically tapered in approaching its longitudinal ends from a maximum cross-sectional dimension at its longitudinal midpoint. A full elliptical spring may be assembled by use of two semi-elliptical springs and, a quarter elliptical by use of one-half of such a spring. Non-symmetrical taper and rectilinear surfaces on the tension and compression side can also be fabricated within the inventive teachings.

End products such as the springs of FIGS. 2 and 3 are solid and unitary. The methods of fabrication with composite materials taught by the invention enable solid unitary springs to withstand differing stresses at differing locations throughout the structure.

The invention teaches use of non-woven, fine filaments or fibers as the stress absorbers. The fibers are held together in side-by-side relationship by a suitable matrix material and extend in substantially the same direction in a single ply. Such fiber plies, in either strip or sheet form, are utilized in the invention. Several plies, pre-impregnated with a matrix material, can be joined to form a multi-ply lamination. A suitable composite material is fiber glass pre-impregnated, or held, in a polymer such as an uncured epoxy. This composite material can be obtained commerically, for example, from the 3M Company, St. Paul, Minnesota, under the trademark Scotchply tape, Type 1002. For purposes of the invention, continuous strip and sheet-like raw materials are preferred. Preferred combinations of single ply and multi-ply laminations are covered in more detail in subsequent description.

In assembling a centrally located core for a spring such as that shown in FIG. 3, plies are cut to predetermined varying lengths. FIG. 4 illustrates schematically assemblage of this embodiment of the invention. Dotted line 34 represents the longitudinal axis, i.e., the neutral axis of the spring. Plies, of shortest longitudinal length, such as 36, are placed in contiguous relationship to the neutral axis 34.

For long life in high-frequency cyclically stressed spring applications, elongated plies are placed along the neutral axis to transfer the stress to the ends of the spring. For substantially static load spring applications, fatigue life is satisfactory without such neutral axis elongated plies. Plies of increasing length are added as a centrally located core 38 is built up in both directions. Outermost ply 40 of the core would have the maximum length of the center core plies which ply 36 would have the minimum length.

The plies of the centrally located core are placed in overlaying relationship longitudinally as shown. The centrally located core 38 is surrounded by peripheral portion 42. In the embodiment shown in FIG. 4, this peripheral portion is built up from a plurality of substantially equal length plies, such as 44, 46, extending between longitudinal ends of the configuration.

The fibers in the individual plies of the centrally located core and peripheral portions are unidirectionally oriented and non-woven. However the direction of orientation of the fibers in certain plies can differ from that in remaining plies as will be considered in more detail later.

In accordance with the invention the peripheral portion of the contoured spring can also be built up by spiral wrapping as shown in FIG. 5. This spiral wrapping includes continuous-length material forming a plurality of layers 48. With the fiber glass-polymer composite material being considered, the assemblage is laid up to the curvature desired and then pressure and heat treated to form a solid unitary structure. The matrix material bonds the fibers together so as to transmit stress from one fiber to another.

Considering fabrication in more detail, after determination of the desired longitudinal midpoint thickness, the thickness of the centrally located core portion can be determined. The average cured thickness of one lamination of fibers is readily available; the thickness of a representative pre-impregnated sample of fiber glass in a polymer such as epoxy is approximately 0.010 inch. From the individual ply thickness, the number of plies required in the centrally located core can be determined.

Lay-up of the centrally located core can begin at the longest lamination required, on either the tension or compression side of the spring, and proceed with decreasing length plies until the shortest ply lies on or near the neutral axis. The remaining side of the center core of a semi-elliptical spring can then be laid up by overlays of increasing length plies symmetrically disposed as shown in FIGS. 4 and 5.

For spring function and fatigue-life purposes, it is preferable to have all fibers oriented in the longitudinal direction. This carries out one concept of the invention of placing longer fibers along directions of greater stress. However, with presently available matrix material, the strength of the composite comes from the fibers. Therefore, provision is made for adding transverse strength to the spring for purposes of avoiding longitudinal splitting of the unitary structure. One method taught for imparting transverse strength is placement of crosssply material contiguous to the outer surfaces of the spring. As a representative teaching, one crossply may be utilized immediately subsurface each outer surface layer of fibers which extend longitudinally on the tension and compression sides. Pre-impregnated tape to required specifications of a longitudinally directed ply overlaying a crossply can be obtained or pre-assembled. Crossplies spaced internally of the crossply contiguous to each surface can be used in static load applications but should not ordinarily be used in high-frequency cyclically stressed application where long fatigue life is a requirement.

A basic concept of the invention is carried out by placement of the plies with the longer fibers in locations of greater stress. The stress on either the tension or compression side of the neutral axis increases with the distance from the neutral axis. With the assembly described, the longest longitudinally directed fibers are located at the greatest distance from the neutral axis. Another distinct advantage of the assembly taught is that the longitudinal ends of the varying length centrally located core plies, when assembled, all lie along the neutral axis of the spring. With the longitudinal ends of these plies at the neutral axis, and therefore at a location of zero bending stress, the bending strength of the structure is enhanced. The possibility of delamination or breakage at an internally terminated end from repeated deflection is substantially eliminated. To enhance these properties elongated plies are placed along the neutral axis with the ends of the core plies contacting the neutral axis plies. This transfers internal stresses in the ends of the spring.

FIG. 6 shows, in expanded form, the neutral axis lay-up of such an embodiment in a spring with integral support bushings at each longitudinal end. Ply 49 lies along the neutral axis between the two bushings. Ply 50, next adjacent to neutral axis ply 49 starts on the tension side of the spring at bushing 50, extends along the tension side, wraps around bushing 51, returns along the compression side of the spring, and around bushing 52 to return to its starting point. The next adjacent ply 53 starts at bushing 51 extends across the tension side of the spring, wraps around bushing 52 and returns along the compression side to its starting point.

The core plies are layed up with their longitudinal ends contiguous to the neutral axis in order to transfer stresses to the ends of the spring along such neutral axis.

As part of the lay-up of the peripheral portion of a static load spring, e.g., the springs shown in FIGS. 4 and 5, a crossply wrap can be used as the first ply over the centrally located core portion. Such a crossply contributes to the transverse strength of the core since the fibers are directed in line with any force attempting to separate the spring transversely, i.e., to help avoid a split running longitudinally of the spring.

The longitudinally directed fibers of the peripheral portion plies are then placed in a series of plies, individual wraps, or continuous spiral wrap until the required number of laminations are obtained. A crossply may be inserted at predetermined intervals during this build-up for example, one crossply for about 15 plies of longitudinally directed fiber plies in static load spring applications where additional transverse strength may be required.

However, for spring functioning purposes, it is preferred to have all fibers of the centrally located core portion and the peripheral portion of the spring structure longitudinally oriented. This orientation places the fibers in a direction to counteract the major stresses during deflection. An important contribution of the invention is a fabrication method which permits this orientation and eliminates crossply material, other than contiguous to an outer surface, while maintaining transverse strength to meet requirements.

In carrying out this latter concept, fibers in the centrally located core portion and peripheral portion of the spring structure are laid up unidirectionally between longitudinal ends. In one embodiment, the resultant configuration is then helically wrapped with an elongated, relatively narrow strip of the composite material. The fibers in this strip are unidirectionally oriented, before lay-up, in the direction of its length. The helical wrapping is angled in both the lateral and longitudinal directions of the spring as shown in FIG. 7. The fibers in helical wrap 60 are directed across and cover both the width and thickness surfaces of the configuration between its longitudinal ends. The wraps are in side-by-side relationship and, preferably, do not overlap, along their side edges.

In the helically wrapped embodiment of FIG. 8, the first helical ply 62 is wrapped in a "left hand" helix from left to right end of the spring. An additional helically wound ply 64 is wrapped in a "right hand" helix from right to left end of the spring over the first helical wrap.

In practice the helical wrapping can be carried out after setting, or curing, or preliminary curing, of the basic configuration. The spring with the helical wrap or wraps is then cured to form a unitary structure. The additional curing of the centrally located core and peripheral portions of the spring is found to have a salutory effect on the strength properties when this double curing step approach is utilized.

To review the assembly, after determining the desired dimensions including longitudinal end and longitudinal midpoint thicknesses, the centrally located core section is devised to provide desired spring contour. The centrally located core section provides for differences of thicknesses along the longitudinal direction of the spring and forms the desired contour for the spring. The peripheral portion of the spring is built-up to be in longitudinal overlying relationship to the centrally located core portion. The cured thickness of each ply is known so that the number of plies in the centrally located portion and in the peripheral portion can be readily determined.

A basic contribution of the invention is the unique coaction in the placement of fibers so as to withstand differing stresses in the structure and achieve desired configuration. Longer fibers are placed in the areas of higher stress and shorter fibers can be placed in the areas of lower stress to obtain both desired strength and configuration.

The assembled plies are treated in a suitable mold to form a unitary structure. The glass fibers of the present embodiment are held together by a thermosetting material which solidifies to a permanent hardness after being held at the prescribed temperature for a predetermined period. A spring assembled from the pre-impregnated tape comprising fiber glass held in a matrix of epoxy is heated to a temperature of above about 150°C. at 50 pounds per square inch pressure.

In practice the plies are laid up in conjunction with a mold of desired semi-elliptical configuration which has been coated with a parting agent such as silicone compound, e.g., Dow-Corning's DC20. The mold and plies are heated for a short time at a temperature below curing temperature, approximately 280°. This gel-time usually extends over approximately 3 to 5 minutes and is carried out with minimal pressure on the plies. The mold is then removed from the furnace and pressure to about 50 psi is gradually applied. The structure is then cured at a temperature between about 150° to 175°C. for a period of time dependent on the size of the spring. A 1 inch wide, ¾ inch thick, 24 inch long spring cures in about 45 minutes. Larger springs require longer time at temperature. Other curing cycles of reduced temperature over longer periods of time after initial high temperature and pressure treatments are available.

A solid unitary structure is thus formed in which the plastic material transmit the stress from one fiber to another. The high strength fiber glass, which is ordinarily brittle, reacts in a non-brittle fashion because of the matrix. One of the advantages of this type of spring as compared to a conventional metallic spring is that, if failure due to working stresses does occur, there is a progressive failure with fibers breaking individually over an extended period of continued satisfactory performance rather than a complete failure as experienced with conventional metallic springs. In other words, a fiber glass spring will fail a fiber at a time so that any break in the fiber glass reinforced spring will occur gradually, while continuing to function, rather than all at once as occurs in steel springs.

Fibers of differing moduli of elasticity can be utilized to fabricate a spring of desired properties. Fiber glass has a lower modulus of elasticity than steel whereas graphite fibers or boron fibers have a higher modulus of elasticity. A typical polymer for bonding of the glass fibers is epoxy. Other polymers include polyesters and polyamides. Because of the brittle nature of glass, filaments which make up the fiber glass strands do not exceed 0.001 inch diameter. Graphite filaments of similar or smaller diameters, e.g., 6.6 microns can be used.

In a typical lay-up of fiber glass-epoxy plies for a semi-elliptical spring of 18 inch length and substantially 0.60 inch midpoint thickness, the centrally located shortest core plies at the neutral axis are approximately 3 inches in length. The plies increase in length from the shortest gradually to slightly less than 18 inches in length at the outside surfaces of the centrally located core. The peripheral portion plies, individual equal length plies or spiral wraps, extend over the full length of the spring. At the longitudinal midpoint a total of about thirty plies make up the centrally located core. The peripheral portion is made up of about 30 plies of material equally distributed on the compression and tension side of the spring.

In a preferred embodiment of the invention for long fatigue life in cyclically stressed spring applications an elongated ply, or plies, extending over the full length of the spring, is placed along the neutral axis as described above in relation to FIG. 6. The advantages of utilizing an elongated ply of fibers along the neutral axis of the spring are shown in the enlarged representational cross-sectional view of FIG. 9. Ply 70 has its fibers oriented in a longitudinal direction and lies along the neutral axis of the spring. The centrally located core plies 72, 73, 74, and 75 are placed in overlying relationship with the shortest ply being contiguous to the neutral axis as shown. Similarly varying length plies are placed on the opposite side of the neutral axis ply 70 extending towards the compression side of the spring. The longitudinal ends of each of the centrally located core plies contact the neutral axis ply. It will be seen that the matrix material 78, 79, and 80 between ends of the centrally located core plies at the neutral axis is of small concentration and, is distributed to a greater degree than the concentrations of matrix material 81 and 82 shown in the embodiment of FIG. 10.

In FIG. 10 the centrally located core plies are laid up without an elongated ply along the neutral axis, an embodiment which can be used satisfactorily for substantially static load applications.

In assembling a spring of the type shown in FIG. 9 having an 18 inch length, semi-elliptical configuration, 1 inch width and a total longitudinal midpoint thickness of substantially 0.620 inch, the dimensions can be built up as follows: An elongated ply, with fibers oriented longitudinally, is located along the neutral axis of the core. The central core portion is built-up by adding plies in order of 3, 6, 7, 10, 11, 12, 12.5, 13, 14, 15, 16, 16.5, and 17.85 inches in length. These plies are laid-up symmetrically with the minimum length ply being contiguous to the neutral axis ply and the overlying plies being of increasing length in both directions toward the compression and tension sides of the spring. Over the centrally located core portion 15 elongated plies approximately 18 inches in length are laid-up on the tension and compression sides.

The configuration defined by the central core portion and the peripheral portion is, in accordance with the teachings of the invention, assembled on a portion of a mold of desired configuration. The mold is coated with a parting compound and preheated as described earlier. A fiber glass-epoxy spring is cured at a temperature of about 165°C. and 50 pounds per square inch pressure.

The combination center core portion and peripheral portion spring configuration after precuring or setting, is helically wrapped with two plies as shown in FIG. 8 with the first ply extending in a left hand helix from the left end of the spring and the second ply extending in a right hand helix from the right end of the longitudinal end of the spring. The spring is then replaced in a mold and the entire combination cured under heat and pressure to form a solid unitary structure.

The helical windings are placed in side-by-side relationship without overlaps so that a smooth surface spring results. The advantages of using elongated plies in the peripheral portion of the spring in place of spiral wrapping is that a sharp angled bend of the spiral wrapping at longitudinal ends of the spring is avoided.

The above-described spring was tested as follows: In a fatigue-life testing machine the spring was deflected through full deflection for one million cycles. No evidence of delamination, fraying or spring failure occurred. The spring was then load-tested at 500 pounds and returned to the fatigue-life tester. The spring was cycled through full deflection for an additional two million cycles before any appreciable loss of load-carrying capability occurred. Slight fraying or delamination occurred over an extended period of time with the decrease in load-carrying capacity. The spring was still performing at ten million cycles.

It should be noted that full-deflection cycling is an unusual and severe form of testing and, was applied to accelerate the program so as to obtain data in the shortest possible time. Metallic springs with the same flexibility cannot be cycled through more than approximately 400,000 cycles of full deflection without failing due to fatigue.

FIG. 11 shows typical mounting means for a fiber-reinforced spring 84 connected at a longitudinal end and the longitudinal midpoint. At each location a layer of low-friction, abrasion-resistant material is used. Suitable abrasion-resistant materials include polyurethane, Teflon (DuPont), Nylatron (Polymer Corporation), nylons, and polyamides. At the longitudinal midpoint abrasion-resistant layers 86 and 88 are placed between clamps 90 and 92. At the longitudinal end, abrasion-resistant layers 94, 96 are placed between the flanges 98, 100 of bearing housing 102.

FIG. 12 shows schematically the lay-up used with a bushing or eyelet for a bearing formed integrally with the spring. A mandrel 104 is supported at the end of centrally located core portion 106. Mandrel 104 is coated with a parting compound. Spiral wrappings of the peripheral portion 108 are wrapped around the mandrel 104. The spring is cured with the mandrel 104 in place. After curing, the aperture formed by mandrel 104 receives a bearing for subsequent mounting of the spring. The bearing can be coated with an abrasion-resistant material on its outer surface or can be formed from a material such as Nylatron, available through the Polymer Corporation, Reading, Pennsylvania.

In the embodiment of FIG. 12, fibers of the peripheral portion plies are longitudinally oriented. The spiral wrappings make the mounting means a part of the unitary structure with the fibers longitudinally oriented in the direction in which stress occurs.

Adaptability to mass production is one of the advantages of the fabrication methods taught. Using sheet-like plies a plurality of springs can be assembled and cured simultaneously. The lay-up of the sheet-like plies follows the earlier description of individual springs with the longitudinal direction of lay-up being coincident with the longitudinal direction for the springs. Side views of the assemblies of FIGS. 4, 5, 6, 9, 10, 12, 14, and 15 are identical for individual strip and sheet-like plies.

After assembly of the center core portion and peripheral portion from sheet-like plies, the composite is cured. As shown in FIG. 13, the assembly is then sliced longitudinally into individual springs of desired width. Thus a plurality of identical spring or springs of varying width can be produced simultaneously. The cured springs can be polished to smooth any of the results of slicing.

If an embodiment calling for use of helical wrapping is made from sheet-like plies, after slicing, the simultaneously produced individual springs can be helically wrapped and cured as described earlier.

Preferably however individual spring lay-ups or multiple-spring lay-ups use a crossply in the penultimate fiber layer to the surface layer. This provides sufficient transverse strength for most applications and eliminates crossplies in locations where shear-plane delamination is likely to occur under high frequency stressing.

Lay-up of the outer wraps of such a preferred embodiment for integral bushing assembly is shown in FIG. 14. Lay-up is preferably made on a mold to impart the desired contour from the outset. Male die member 108 includes contour indentations 109 and 110 for reception of bushing contours during assembly and, during compressing and curing. Surface 111 of the male die member contacts the tension side of the spring contour. Outer wrap 112 is laid along this contour with an overhang portion 114 to provide the outer wrap ply on the compression side. The length of this outer ply is selected to make a full wrap, i.e., extending the full length along the tension and compression sides and around the bushings.

This outer wrap ply can include two fiber layers laminated together. In the outermost laminate the fibers extend longitudinally between ends of the spring. The next inner laminate can comprise crossply fibers, i.e., at an angle, such as 90°, to the longitudinal direction. In that way, the crossply layer is contiguous to the surface on both the tension and compression sides of the spring. The number of plies in the outer wrap portion is selected based on the spring application and desired spring dimensions.

Note that overlay for the compression side exists on alternate longitudinal ends. As shown in FIG. 14 the second ply 115 includes compression-side overlay 116 on the left side of the spring. In this way, the juncture lines for longitudinal ends of these elongated wraps occur in alternate relationship at opposite longitudinal ends of the spring structure.

Assembly of the elongated spring of FIG. 14 on the curvilinearly contoured die member is an important aspect of the invention for purposes of smooth lay-up without crimping or bending of the fibers and to avoid air pockets, problems which can occur when attempting to lay up a spring on a planar surface and then placing it on a curved mold for curing.

After the outer wraps are positioned as shown in FIG. 14 the tension side core portion is laid up with progressive shorter lengths in approaching the neutral axis. The number and length are selected dependent on desired spring characteristics and dimensions.

The elongated plies along and contiguous to the neutral axis, of the type shown in FIG. 6, are then laid up. In practice the plies are laid up with overhang portions of the wraps extending outside the die contour. The neutral axis ply is placed and then the bushings are positioned. The wraps contiguous to the neutral axis are then wound around the bushings with juncture lines occurring alternately at opposite longitudinal ends as considered in relation to FIG. 6.

After the bushings have been wrapped with the elongated plies contiguous to the neutral axis, the core plies on the compression side are laid up with shortest ply innermost and of progressively increasing length in approaching the compression side.

In this manner longitudinal ends of the core plies contact the elongated plies contiguous to or at the neutral axis and transfer internal stresses to the longitudinal ends of the spring.

After the compression side core plies are in place, the overhang portion of the outer wraps are placed on the compression side and, in this step, are wrapped around the bushings.

An expanded view in cross section of a simplified version of this embodiment lay-up, in accordance with the instructions relating to FIGS. 6 and 14 above, is shown in FIG. 15. In this embodiment bushings 120 and 121 are located at opposite longitudinal ends of the spring structure. Neutral axis ply 122 extends along the neutral axis between these bushings. Plies 124 and 125 are wrapped around the bushing and located contiguous to the neutral axis. Plies of varying length form the tension side core portion 128 of the central core. On the compression side, varying length plies form the compression side portion 130 of the central core.

Note that the longitudinal ends of the varying length plies contact the elongated plies forming part of or contiguous to the neutral axis. Also note that in this embodiment the central core plies are not located equidistantly from the bushings. Their location along the longitudinal axis is dependent upon physical requirements of the spring; in many uses, for example in some snowmobile uses, one leg of the spring can be longer than the remaining leg. The central core plies therefore, in addition to imparting desired configuration, also establish a location for the spring clamping mechanism shown schematically at 132.

The peripheral portion of the spring structure of FIG. 15 comprises a plurality of wrap-around plies such as 134, 136 contiguous to the outer surface. One of the outer plies comprises crossply fibers in order to introduce transverse strength.

It should also be noted that the juncture lines for wrap-around plies occur alternately at opposite longitudinal ends of the strip.

While a simplified embodiment is shown in FIG. 15, it should be understood that the number of plies in the neutral axis portion, core portion, and peripheral portion can vary widely dependent on desired characteristics and dimensions. In a typical snowmobile ski having overall dimensions of 28.75 inches length, 2.0 inches width, and 0.63 inches thickness along the central load line, nine wrap-around plies are used in the peripheral portion, twenty-one plies are used in each core portion on opposite sides of the neutral axis, and two wrap-around plies are used at the neutral axis. The longitudinal length of the wrap-around plies varies slightly, increasing as outer plies are reached, to allow for the added circumference around the bushings due to interior wrappings. Essentially these wrap-around plies are elongated plies covering two full lengths of the elliptical surface of the spring structure and varying in length to allow for the changing dimension around the bushings and along the outer surface as the spring is built up.

Ordinarily this assembly would be made in sheet material and after curing would be cut longitudinally to form multiple individual springs from two to twenty or more.

In spring applications calling for a free end with a bushing at the remaining end, the wrap-around plies would wrap around the bushing and ends of each ply would meet at the free end.

Specific embodiments of the invention have been described in disclosing various contributions made by the invention. The concepts taught can be utilized in arriving at other embodiments without departing from the scope of the invention as defined in the following claims.

What is claimed is:

1. Method for forming a fiber-reinforced composite spring having a tension side and a compression side, a neutral axis extending longitudinally between its longitudinal ends, and a varying cross-sectional area measured in a plane perpendicular to the neutral axis with the cross-sectional area diminishing in approaching at least one of the longitudinal ends of the spring providing a tapered configuration, comprising the steps of
   providing a plurality of varying-length plies comprising solely non-woven fibers in side-by-side, longitudinally oriented, unidirectional relationship, such fibers being held in a curable matrix material,
   providing a plurality of elongated full-length plies comprising solely non-woven fibers in side-by-side, longitudinally oriented, unidirectional relationship with the fibers being held in a curable matrix material, such elongated plies extending at least over the full longitudinal length of the composite spring being formed,
   providing a molding means having a configuration conforming to the desired tapered configuration of the elongated spring being formed,
   assembling such varying length plies and such elongated full-length plies to form a composite spring, with shorter length plies of the varying length plies being centrally located contiguous to the neutral axis and plies of progressively increasing length of such varying length plies being located outwardly from such neutral axis in the direction of both the tension and compression sides of the composite spring being formed and including
   placing an elongated ply comprising solely nonwoven fibers in side-by-side longitudinally oriented, unidirectional relationship along the neutral axis to extend between longitudinal ends of the spring being formed,
   with such plurality of elongated full length plies overlying such varying length plies, and
   treating such assemblage of plies to cure such matrix material to form a solid unitary structure in which the non-woven fibers of such assemblage of plies are bonded together by the cured matrix material.

2. The method of claim 1 in which such plurality of elongated full length plies have a length at least twice the length of the spring being formed and such plies are laid up by placing the plurality of elongated full length plies on the mold means with a portion of such plies extending between longitudinal ends of the spring defined by such mold means and the remaining portion of such full length plies overhanging such mold means,
   placing such plurality of varying length plies and such neutral axis elongated ply forming the centrally located core on the portion of the full length plies on the mold means, and
   placing the remaining portion of the full length plies in overlying relationship to such centrally located core.

3. The method of claim 2 including the step of assembling eyelet means at at least one longitudinal end of the spring integrally with such spring by wrapping portions of the full length plies around the eyelet means when such remaining portion of the full length plies is placed in overlying relationship to the centrally located core plies.

4. The method of claim 1 in which such neutral axis lay-up includes a plurality of elongated plies,
   assembling eyelet means at at least one longitudinal end of the spring, such eyelet means being positioned along the neutral axis, and
   wrapping at least one ply of the neutral axis lay-up around the eyelet means.

5. The method of claim 1 in which the elongated full length plies are assembled with at least one ply which is located contiguous to an outer surface of the spring means having its fibers oriented laterally in relationship to the longitudinal direction and extending across the width of the spring.

6. Method for forming a fiber-reinforced composite spring of elongated tapered configuration with cross-sectional area in a plane perpendicular to the longitudinal axis of the elongated tapered configuration diminishing in approaching at least one longitudinal end of the composite spring, comprising the steps of
   providing a plurality of varying-length plies comprising solely non-woven fibers in side-by-side, longitudinally oriented, unidirectional relationship, such fibers being held in a curable matrix material,
   providing a plurality of elongated full-length plies comprising solely non-woven fibers in side-by-side, longitudinally oriented, unidirectional relationship with the fibers being held in a curable matrix material, such elongated plies extending at least over the full longitudinal length of the composite spring being formed,
   assembling such varying length plies and such elongated plies to form a composite spring with shorter length plies of the varying length plies being centrally located to provide the tapered configuration and with such plurality of elongated plies overlying such varying length plies,
   providing an elongated tape-like ply comprising unidirectionally oriented, non-woven fibers in a curable matrix material,
   helically wrapping such elongated tape-like ply about the combined varying length plies and overlying elongated plies with the unidirectionally oriented non-woven fibers in such helically wrapped plies being oriented in transverse relationship to the longitudinal axis of such composite spring, with such wrapping extending between longitudinal ends of such composite spring, and
   treating such helically wrapped structure to form a solid unitary structure in which non-woven fibers of the varying-length plies, full-length plies and helically wrapped ply are bonded together by the matrix material.

7. Method for producing a plurality of elongated, fiber-reinforced springs of tapered configuration with cross-sectional area of such springs in a plane perpendicular to the longitudinal axis of the elongated tapered configuration diminishing in approaching at least one longitudinal end of such composite spring, comprising the steps of provinding a plurality of sheet-like plies comprising solely woven fibers in side-by-side, longitudinally oriented, unidirectional relationship held in a curable matrix material, such plies being of predetermined varying length in such longitudinal direction, providing a plurality of sheet-like elongated plies extending at least over the full length between longitudinal ends of the spring configuration with such elongated full-length plies comprising solely non-woven fibers in side-by-side, longitudinally oriented, unidirectional relationship, with the fibers being held in a curable matrix material, assembling such varying length sheet-like plies with shorter length plies being centrally located longitudinally to provide the tapered configuration and with elongated full-length sheet-like plies overlaying such varying length plies, treating such combined varying length plies and overlying elongated plies to cure the matrix material forming a solid unitary structure in which the non-woven fibers of such varying length plies and elongated full-length plies are bonded together by matrix material, and cutting such cured, unitary structure along a longitudinally oriented plane extending between longitudinal ends of such configuration in parallel relationship to longitudinally oriented fibers of such varying length plies and overlying full-length plies to form a plurality of elongated tapered configuration springs.

8. Method for forming a fiber-reinforced composite spring of elongated tapered configuration having a neutral axis extending between its longitudinal ends comprising the steps of forming a configuration-defining, centrally located core by overlaying a plurality of plies of solely non-woven, unidirectionally oriented, fibers held in a curable matrix material, such plies being longitudinally oriented and of predetermined varying length substantially less than the distance between longitudinal ends of the spring, the plurality of varying length plies forming the centrally located core being laid up with minimum length plies located contiguous to the neutral axis of the spring and central core plies of maximum length being located outermost in relation to the neutral axis, such lay-up of varying length plies being symmetrical with respect to the neutral axis and including placing at least one elongated ply of solely non-woven fibers along the neutral axis to extend between longitudinal ends of the spring, the fibers of such neutral axis ply being longitudinally oriented, placing a plurality of elongated plies extending between longitudinal ends of the spring in overlying relationship to the centrally located core, the elongated plies comprising solely non-woven unidirectionally oriented fibers held in a curable matrix material, and treating such assemblage of plies to cure the matrix material to form a solid unitary structure in which the non-woven fibers are bonded together by the cured matrix material.

9. The method of claim 8 in which the matrix material comprises a polymer such as epoxy and in which the assemblage of plies are treated in a mold having an internal configuration conforming to the desired tapered configuration of the spring to form the solid unitary structure, the assemblage of plies being held under pressure during heat treatment in the mold at a temperature above about 150°C.

10. The method of claim 8 in which the plurality of elongated plies overlying the centrally located core portion are laid up with at least one ply located contiguous to an outer surface of the spring having its fibers oriented laterally in relationship to the longitudinal direction and extending across the width of the spring.

* * * * *